United States Patent
Shao et al.

(10) Patent No.: US 7,979,784 B2
(45) Date of Patent: Jul. 12, 2011

(54) METHOD AND SYSTEM FOR ENHANCING TRANSMISSION RELIABILITY OF VIDEO INFORMATION OVER WIRELESS CHANNELS

(75) Inventors: Huai-Rong Shao, San Jose, CA (US); Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1103 days.

(21) Appl. No.: 11/728,002

(22) Filed: Mar. 22, 2007

(65) Prior Publication Data

US 2007/0234134 A1 Oct. 4, 2007

Related U.S. Application Data

(60) Provisional application No. 60/787,250, filed on Mar. 29, 2006.

(51) Int. Cl.
*G06F 11/10* (2006.01)
*H03M 13/00* (2006.01)

(52) U.S. Cl. .................. 714/807; 375/240.12
(58) Field of Classification Search .......... 714/786,807; 375/240.12
See application file for complete search history.

(56) References Cited

U.S. PATENT DOCUMENTS

| | | | |
|---|---|---|---|
| 6,161,207 A * | 12/2000 | Lockhart et al. | 714/758 |
| 6,681,364 B1 | 1/2004 | Calvignac et al. | |
| 6,757,851 B1 | 6/2004 | Park et al. | |
| 7,178,082 B2 | 2/2007 | Yu et al. | |
| 7,346,018 B2 | 3/2008 | Holtzman et al. | |
| 7,599,363 B2 | 10/2009 | Jang et al. | |
| 2002/0191643 A1 | 12/2002 | Yun et al. | |
| 2003/0212946 A1* | 11/2003 | Kroeger | 714/786 |
| 2005/0123042 A1* | 6/2005 | Park | 375/240.12 |
| 2006/0034317 A1 | 2/2006 | Hong et al. | |
| 2007/0165566 A1 | 7/2007 | Khan et al. | |
| 2007/0189397 A1 | 8/2007 | Ngo et al. | |
| 2009/0086638 A1 | 4/2009 | Niu et al. | |

(Continued)

FOREIGN PATENT DOCUMENTS

CN 1292626 4/2001

(Continued)

OTHER PUBLICATIONS

Hitachi, Ltd. et al., High-Definition Multimedia Interface (HDMI) Specification Version 1.2, Aug. 22, 2005, pp. 1-214.

(Continued)

*Primary Examiner* — Sam Rizk
(74) *Attorney, Agent, or Firm* — Kenneth L. Sherman, Esq.; Michael Zarrabian, Esq.; Myers Andras Sherman & Zarrabian LLP

(57) ABSTRACT

A method and system for enhancing transmission reliability of video information over a wireless channel is provided. The video information includes pixels, each having a plurality of components and each component including video information bits that are placed in sub-packets within a packet. Error detection information is determined for one or more sub-packets, and placed in the packet. Then the packet is transmitted from a transmitter to a receiver a wireless channel, wherein the receiver uses the error detection information per sub-packet to check for transmission errors and request retransmission of erroneous video information bits based on their perceptual importance.

58 Claims, 15 Drawing Sheets

U.S. PATENT DOCUMENTS

2009/0086699 A1    4/2009    Niu et al.
2009/0132893 A1    5/2009    Miyazaki et al.

FOREIGN PATENT DOCUMENTS

WO               0002320       1/2000
WO    WO 2004034654 A1    4/2004

OTHER PUBLICATIONS

Supplementary European Search Report and Search Opinion; Application No. 07745691.1-2223, dated Apr. 1, 2010, 11 pp., European Patent Office, Munich, DE.

Masala, E. et al., "MAC—Level Partial Checksum for H.264 Video Transmission over 802.11 Ad Hoc Wireless Networks," Vehicular Technology Conference, 2005. VTC 2005-Spring. 2005 IEEE 61ST, IEEE, Piscataway, NJ, USA, vol. 5, May 30, 2005, pp. 2864-2868, XP010855973, ISBN: 978-0/7803-8887-1.

Chinese Office Action dated Mar. 29, 2010 issued in Chinese Patent Application No. 200780007976.X, 4 pp. China Patent Office, CN (English-language translation included—7 pp.).

Patent Cooperation Treaty; Intenational Search Report and written opinion for PCT/KR2007/001528. Jul. 9, 2007.

U.S. Appl. No. 60/773,826, filed Feb. 15, 2006, Shao, H. et al.

Wu, Y. et al., "A Vacation Model with Setup and Close-Down Times for Transmitter Buffer of ARQ Schemes," 14th IEEE 2003 International Symposium on Personal, Indoor and Mobile Radio Communications (PIMRC), vol. 3, IEEE, Sep. 7-10, 2003, downloaded Jul. 28, 2009, pp. 2054-2058, United States.

Van Veen, B.D. et al., "Beamforming: A Versatile Approach to Spatial Filtering," IEEE ASSP Magazine, vol. 5, No. 2, IEEE, Apr. 1988, pp. 4-24, New York, NY, United States.

Caetano, L., "SiBEAM—60 GHz Architecture for Wireless Video Display," SiBEAM, Inc., White Paper, Mar. 2006, pp. 1-6, United States.

FreshNews.com, "SiBEAM Receives Equity Investment from Best Buy," FreshNews.com, Jan. 4, 2010, pp. 1-2, United States, downloaded from http://freshnews.com/print/node/261440 on Feb. 2, 2010.

International Preliminary Report on Patentability dated Sep. 30, 2008 for International Application No. PCT/KR2007/001528 from Korean Intellectual Property Office, filed Mar. 29, 2007, pp. 1-7, Seo-gu, Daejeon, Republic of Korea.

Hachman, M., "CE Giants back Amimon's Wireless HDTV Tech," PCMAG.com, Jul. 23, 2008, p. 1, United States.

PHYSorg.com, "NEC Develops Compact Millimeter-Wave Transceiver for Uncompressed HDTV Signal Transmission", PHYSorg.com, Apr. 1, 2005, pp. 1-2, United States, downloaded from http://www.physorg.com/news3569.html on Sep. 29, 2006.

LG Electronics, Inc., "WirelessHD Specification Version 1.0 Overview," Oct. 9, 2007, pp. 1-77, United States.

U.S. Non-final Office Action for U.S. Appl. No. 11/906,193 mailed Sep. 1, 2009.

U.S. Final Office Action for U.S. Appl. No. 11/906,193 mailed Mar. 5, 2010.

U.S. Notice of Allowance for U.S. Appl. No. 11/906,193 mailed Jun. 24, 2010.

\* cited by examiner

METHOD AND SYSTEM FOR ENHANCING TRANSMISSION RELIABILITY OF VIDEO INFORMATION OVER WIRELESS CHANNELS

RELATED APPLICATION

This application claims priority from U.S. Provisional patent application Ser. No. 60/787,250, filed on Mar. 29, 2006, incorporated herein by reference.

FIELD OF THE INVENTION

The present invention relates to transmission of video information and in particular to enhancing transmission reliability of video information.

BACKGROUND OF THE INVENTION

With the proliferation of high quality video, an increasing number of electronic devices (e.g., consumer electronics devices) utilize high definition (HD) video which can require multiple gigabit per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows the transfer of uncompressed HD signals between devices via a cable. While consumer electronics makers are beginning to offer HDMI-compatible equipment, there is not yet a suitable wireless (e.g., radio frequency (RF)) technology that is capable of transmitting uncompressed HD video signals. Wireless local area network (WLAN) and similar technologies can suffer interference issues when several devices are connected which do not have the bandwidth to tarry the uncompressed HD signal, and do not provide an air interface to transmit uncompressed video over 60 GHz band.

BRIEF SUMMARY OF THE INVENTION

A method and system for enhancing transmission reliability of video information over a wireless channel is provided. The video information includes pixels, each having a plurality of components and each component including video information bits that are places in sub-packets within a packet. Error detection information is determined for one or more sub-packets, and placed in the packet. Then the packet is transmitted from a transmitter to a receiver over a wireless channel, wherein the receiver uses the error detection information per sub-packet to check for transmission errors and request retransmission of erroneous video information bits based on their perceptual importance.

In one embodiment, this is achieved by sub-packetizing video information in each packet, and providing error detection/correction information including multiple cyclic redundancy code (CRC) checks, per sub-packet in each packet.

Upon receiving each packet, the receiver detects error based on the multiple CRC checks per sub-packet, and transmits an acknowledgment (ACK) packet to the sender, indicating such errors. The sender then selectively retransmits the information in the sub-packets received in error based on perceptual importance of such information.

These and other features, aspects and advantages of the present invention will become understood with reference to the following description, appended claims and accompanying figures.

DETAILED DESCRIPTION OF THE INVENTION

Figure 1:
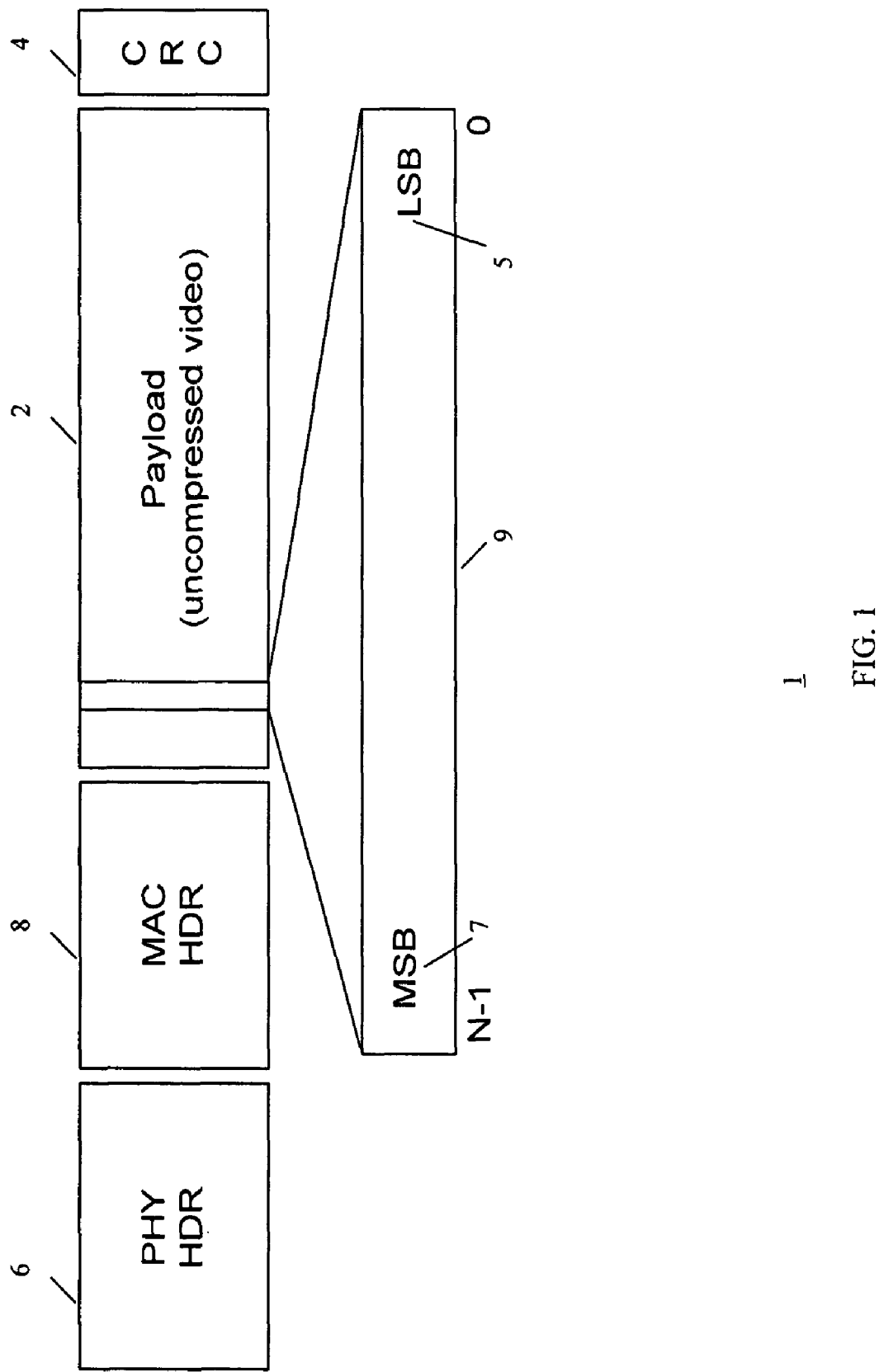
FIG. 1 shows an example of a data packet including a payload of uncompressed video pixel components that has a bit complemented in transmission from a sender to a receiver over a wireless channel.

The present invention provides a method and system for enhancing transmission reliability of video information packets from a sender to a receiver over wireless channels (e.g., RF). In one embodiment, this is achieved by sub-packetizing uncompressed video information in each packet, and providing error detection/correction information, such as multiple CRC checks, per sub-packet in each packet.

Even if a wireless medium has enough bandwidth to support uncompressed HD 1080p video, in case of transmission errors in some video packets, it is not desirable to retransmit entire uncompressed video streams. Typically, a video frame of pixels is divided into multiple scan lines. Each scan line contains an integer number of pixels, which are denoted by a number of pixel components. Quantization for pixel depth, or bits per pixel component (bitplane), may be 8-bit, 10-bit, 12-bit or 16-bit values. A pixel component contains either a color component (chrominance) or a luminance component of the video. Considering an 8-bit quantization and a 60 frames/second, a one second long uncompressed video (1080 p) segment can be expressed as 60×3×8×1420×1080=2.98 gigabits. Typically, it is not possible to retransmit the entire stream from a sender (transmitter) to a receiver without violating the presentation deadline of a sink device such as a TV display.

Accordingly, the present invention further allows selective retransmission of video data based on human perceptual importance of such data. Given a frame of video pixels, wherein each pixel comprises multiple components (e.g., R, G, B), different bits of each pixel component do not equally affect the video quality. For example, a most significant bit (MSB) largely affects the uncompressed video quality, and therefore has a higher perceptual importance, compared to a least significant bit (LSB). Therefore, in the case of retransmission according to an embodiment of the present invention, the MSBs are given the highest retransmission preference to conserve bandwidth and reduce retransmission delay.

Example implementations of the present invention are now described. In many wireless communication systems, a frame structure is used for data transmission between a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such a source addresses (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

FIG. 1 presents an example of a conventional data packet 1, including a payload 2 of M uncompressed video pixel components, each component having an N bit bitplane, that is transmitted from a sender (e.g., uncompressed video stream source) to a receiver (e.g., uncompressed video stream sink) over a wireless channel. In addition to including the payload 2, the packet 1 includes a CRC value in a CRC field 4 for the video pixels, and the usual physical layer header (PHY HDR) 6 and MAC layer header (MAC HDR) 8.

In one example, during transmission, a MSB 7 of an N bit pixel component 9 in the payload 2 is complemented (i.e., corrupted), causing a CRC error at the receiver. In another example, during transmission, a LSB 5 of an N bit pixel component 9 in the payload 2 is complemented, causing a CRC error at the receiver. Since the CRC value comprises a checksum over the entire payload, it is not feasible to determine at the receiver whether the MSBs or the LSBs are corrupted. Moreover, retransmission of the payload when the LSB is complemented can be futile since a corrected LSB does not provide any discernable improvement to received video quality.

A transmission packet according to an embodiment of the present invention includes a payload of M pixel components, each pixel component comprising N bits, and the P=M×N payload bits are divided into K sub-packets of L bits each. Each sub-packet comprises a sub-packet header, a payload and a CRC sub-field, such that the sub-packet header includes a sequence number indicating the order of the corresponding sub-packet in the packet. The sequence number is assigned in monotonically increasing order starting from zero, whereby the sequence number of a first sub-packet is 0, and the sequence number of a $K^{th}$ sub-packet is K−1. The packet includes multiple CRC fields corresponding to the multiple sub-packets, wherein the CRC value for each sub-packet in a corresponding CRC sub-field in the packet.

Each sub-packet includes a plurality of subsets of bits in the sub-packet, wherein a CRC value for the information bits in each sub-packet is determined by further determining a CRC sub-value for each subset of bits, thereby generating a plurality of CRC sub-values for the corresponding plurality of subsets of bits.

The sender provides a CRC Control Field in a MAC header of the packet to signal the receiver how the sub-packets are formed for CRC computation and error detection at the receiver. The CRC Control Field includes: a CRC Count (CRCC) field that indicates the number of CRC values for the packet or per sub-packet, and a CRCBitmap field comprises an array of N bits, each of which corresponds to one of the N bitplanes of a pixel, wherein a MSB of the CRCBitmap corresponds to a MSB bitplane, zero entries in the CRCBitmap identify bitplanes that are excluded from the CRC computation, and non-zero entries identify bitplanes that are included in the CRC computation.

Upon receiving a packet, based on the CRC values in the packet, the receiver determines corrupted information in each sub-packet, and generates an ACK packet to indicate the corrupted information to the sender. The ACK packet is transmitted to the sender, wherein based on the ACK packet, the sender generates a retransmit packet including information bits that are indicated as corrupted in the last packet by the ACK packet, and transmits the retransmit packet to the receiver.

The retransmit packet includes information bits that are indicated as corrupted in the last packet by the ACK packet, based on human perceptual importance of such information. Preferably, the retransmit packet includes only information bits that have high perceptual importance. For example, the retransmit packet includes only the MSBs of a corrupt sub-packet.

Figure 2:
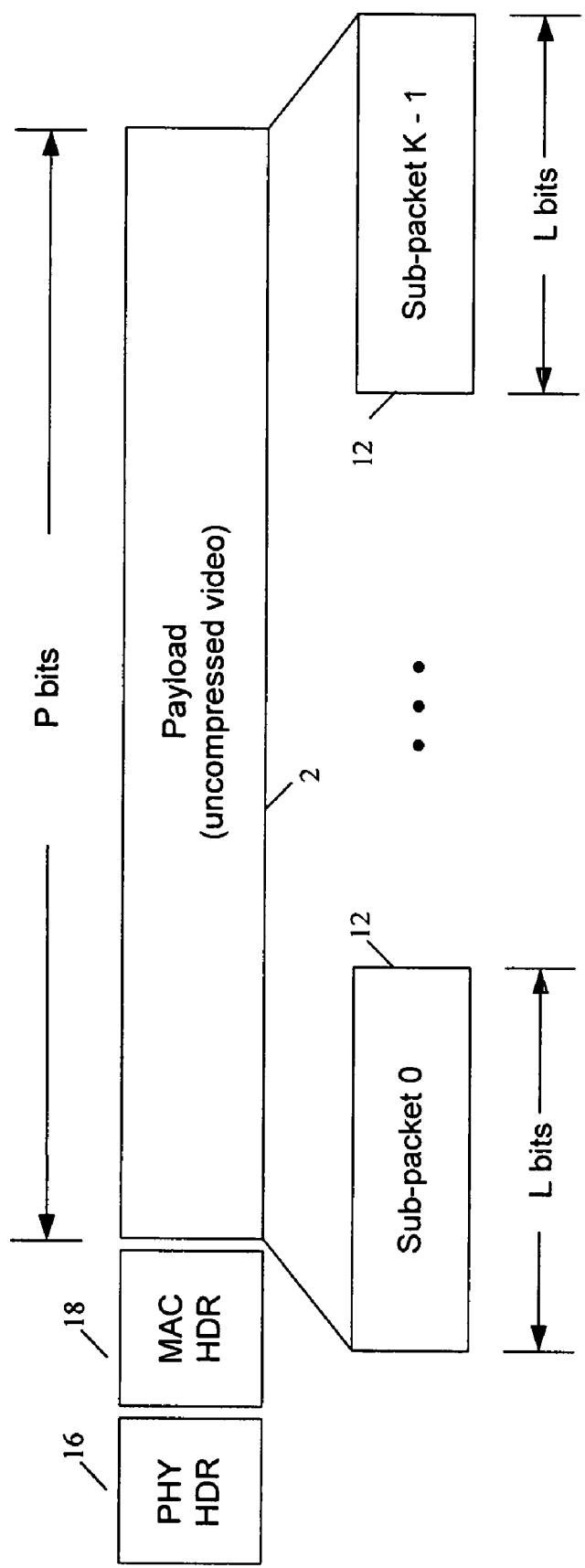
FIG. 2 shows a data packet with a payload comprising multiple sub-packets and multiple CRCs, for enhancing transmission reliability of uncompressed video packets over wireless channels, according to an embodiment of the present invention.

FIG. 2 shows an example transmission packet 10 according to the present invention, wherein an uncompressed video payload 2 of P=M×N bits is divided into K sub-packets 12 (i.e., Sub-packet 0, . . . , Sub-packet K−1) of L bits each in the packet 10, for transmission to a wireless receiver over a channel (wherein M represents the number of pixel components, and N represents the number of bits in the bitplane of each pixel component). The sender and the receiver negotiate the value of L during a connection set-up phase therebetween. In one example, a video stream represents multiple pixels, each pixel having three components (e.g., R, G, B or Y, Cb, Cr), each component having multiple bits (e.g., classified as MSBs and LSBs), wherein in each sub-packet, the MSBs and LSBs can be separated or mixed together. In one example, each incoming information bit is placed into the sub-packet with available space to carry more bits. Then, when the sub-packet is full, the incomings are placed into a next sub-packet. In another example, it is also possible to place incoming bits within similar perceptual importance into the same sub-packet (e.g., one sub-packet with only MSBs, another with only LSBs, etc.). In yet another example, information bits with different perceptual importance can be mixed together in a sub-packet.

The packet 12 further includes a PHY HDR 16 and a MAC HDR 18. Each sub-packet 12 further includes multiple CRC values for the video payload stored therein (e.g., FIG. 7, $CRC_1$ and $CRC_2$ described further below). The CRC values correspond to different bitplanes in a sub-packet payload (e.g., FIG. 1, $CRC_1$ for the MSBs and $CRC_2$ for the LSBs, described further below).

Figure 3:
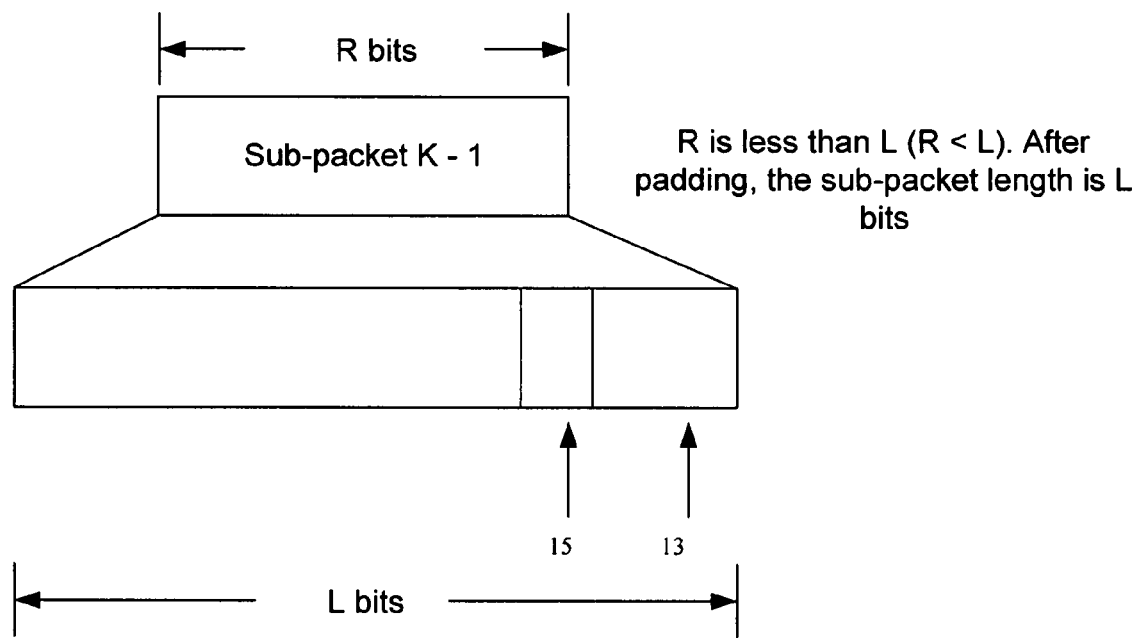
FIG. 3 shows sub-packet padding, according to an embodiment of the present invention.

The last sub-packet 12 in the packet 10 can be less than L bits, wherein as shown by example in FIG. 3, the sender adds some padding bits 13 to the last sub-packet 12, to make the length of the last sub-packet 12 equal to L bits. The sender informs the receiver of the padding by including a delimiter 15 before the padding bits 13, wherein the delimiter 15 is known to the receiver. This allows the receiver to ignore the padding bits 13.

Figure 4:
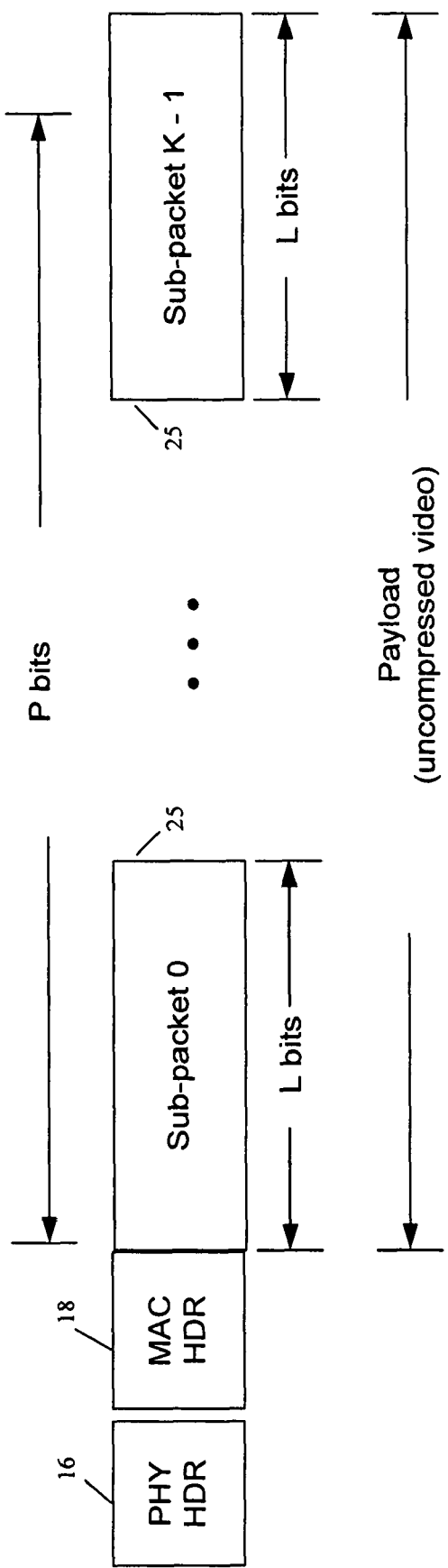
FIG. 4 shows a data packet with a payload comprising multiple sub-packets, according to an embodiment of the present invention.

FIG. 4 shows another example packet 20 according to the present invention, wherein the sender can include K uncompressed video sub-packets 25 in the packet 20, each sub-packet 25 is L bits long, and the last packet includes padding data as necessary to bring it up to L bits. Thus, the total length of the payload is K×L=P bits.

Figure 5:
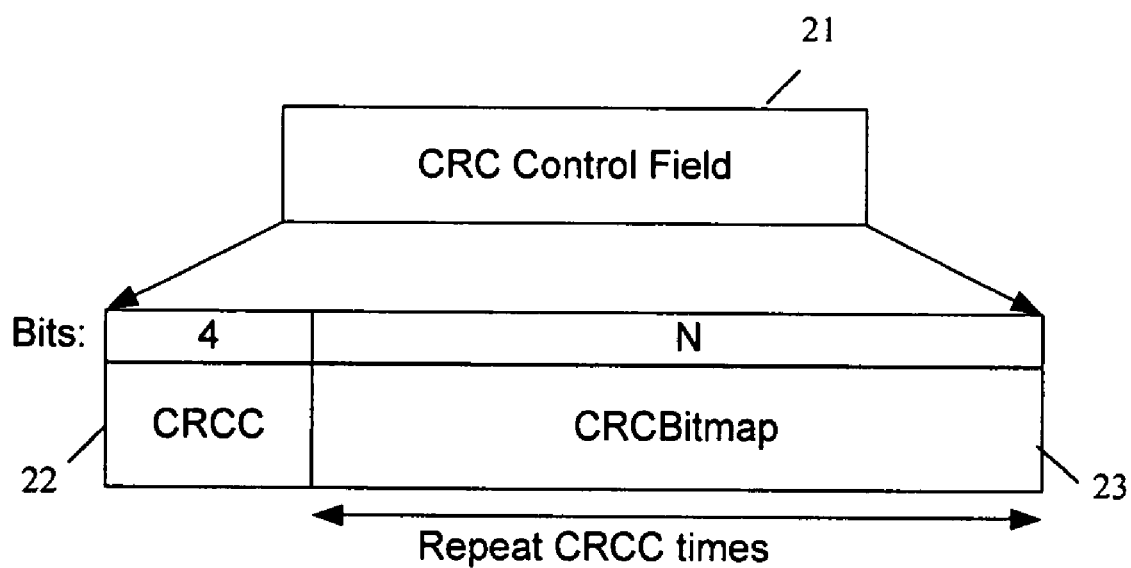
FIG. 5 shows a CRC Control Field in the Media Access Control (MAC) header of the data packet of FIG. 2, according to an embodiment of the present invention.

Referring to FIG. 5, the sender further places a CRC Control Field 21 in the MAC HDR 18 of the packet 10 in FIG. 2 (or packet 20 in FIG. 4) which indicates the structure of CRC information for the sub-packets 12. The receiver uses the information in the CRC Control Field 21 for CRC error detection, as described further below. As shown in FIG. 5, the CRC Control Field 21 includes a CRC Count (CRCC) field 22 that indicates the number of CRC values used for each sub-packet 12 of the payload in packet 10.

In this example, the CRCC field 22 is 4 bits long. The CRC Control Field 21 further includes a CRCBitmap field 23 which defines which bitplanes of the payload data in a sub-packet each CRC value corresponds to. In this example, the CRCBitmap field 23 comprises an array of N bits, each of which corresponds to one of the N bitplanes of a pixel (typical value for N is 8, 10, 12 or 16). The MSB of the CRCBitmap corresponds to the MSB bitplane. The zero entries in the CRCBitmap identify bitplanes that are excluded from the CRC computation, while non-zero entries identify bitplanes that are to be included.

For each sub-packet, each possible bitplane combination may be selected. Alternatively, bitplanes may be selected in conjunction with an Unequal Error Protection (UEP) mode. The CRCBitmap is repeated CRCC times (CRCC×N long), which indicates the number of bitplane combinations selected.

Figure 6:
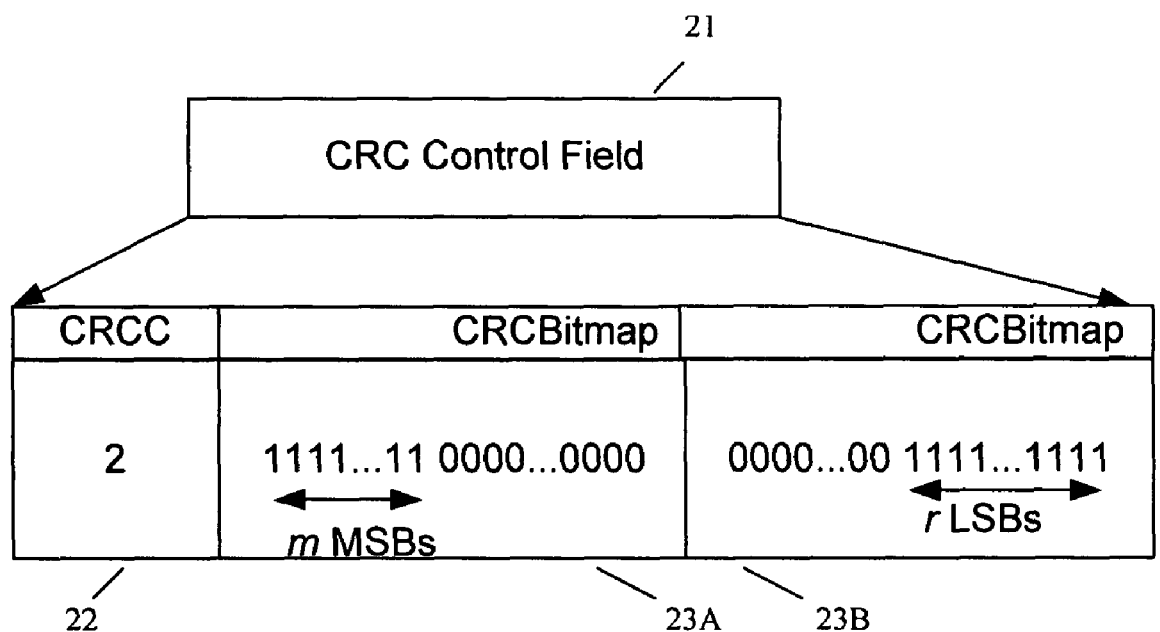
FIG. 6 shows another CRC Control Field in the MAC header of the data packet of FIG. 2, according to an embodiment of the present invention.
Figure 7:
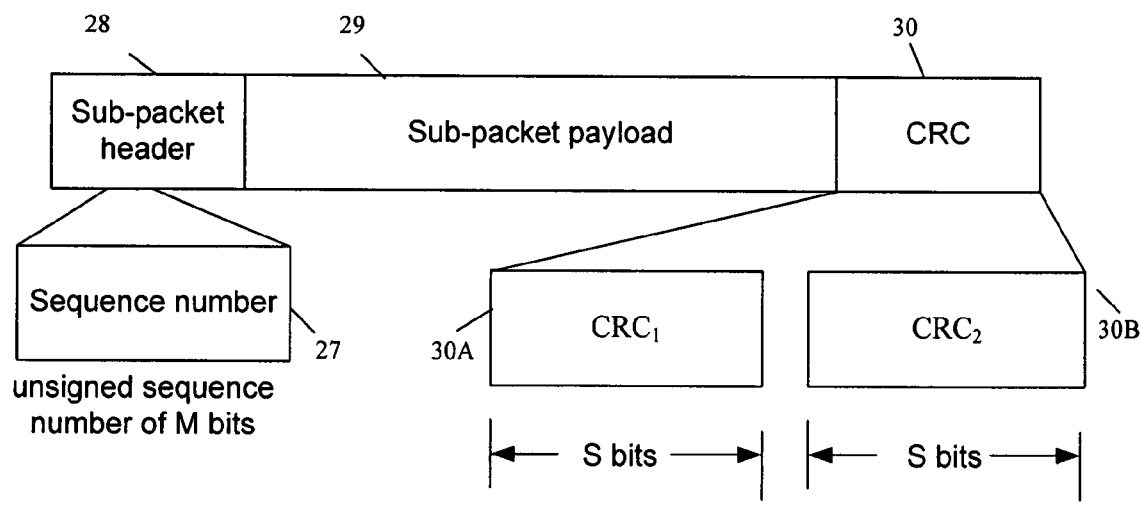
FIG. 7 shows the details of a sub-packet in FIG. 2, according to an embodiment of the present invention.

FIG. 6 shows an example of a CRC Control Field 21 including a CRCC field 22 and two CRCBitmap fields 23A and 23B, whereby the CRCC field 22 is set to 2, indicating that a sub-packet includes two CRC values for its payload (e.g., sub-packet 12 in FIG. 7 includes $CRC_1$ and $CRC_2$ for a payload 29). The first CRCBitmap 23A in FIG. 6 indicates that m MSBs out of N bitplanes in the sub-packet payload are used to compute a first CRC value for a sub-packet payload. The second CRCBitmap 23B indicates that r LSBs out of N bitplanes in the sub-packet payload are used to compute a second CRC value for the sub-packet payload. The values of m and r are negotiated by the sender and the receiver during the connection set-up phase.

FIG. 7 shows further details of each sub-packet 12 that is formed by the sender in the packet 10. Each sub-packet 12 includes a sub-packet header 28, a payload 29 and a CRC sub-field 30. The sub-packet header 28 includes a sequence number subfield 27 which is M bits, such that $2^M \geq K$, indicating the sequential order of the corresponding sub-packet 12 in the packet 10. For each sub-packet 12, the corresponding sequence number 27 is assigned in monotonically increasing order starting from zero. Thus, the sequence number of the first sub-packet 12 is 0, and the sequence number of $K^{th}$ sub-packet 12 is K−1. The CRC sub-field 30 includes a $CRC_1$ value in a field 30A and a second $CRC_2$ value in a field 30B, which are each S bits long.

Figure 8:
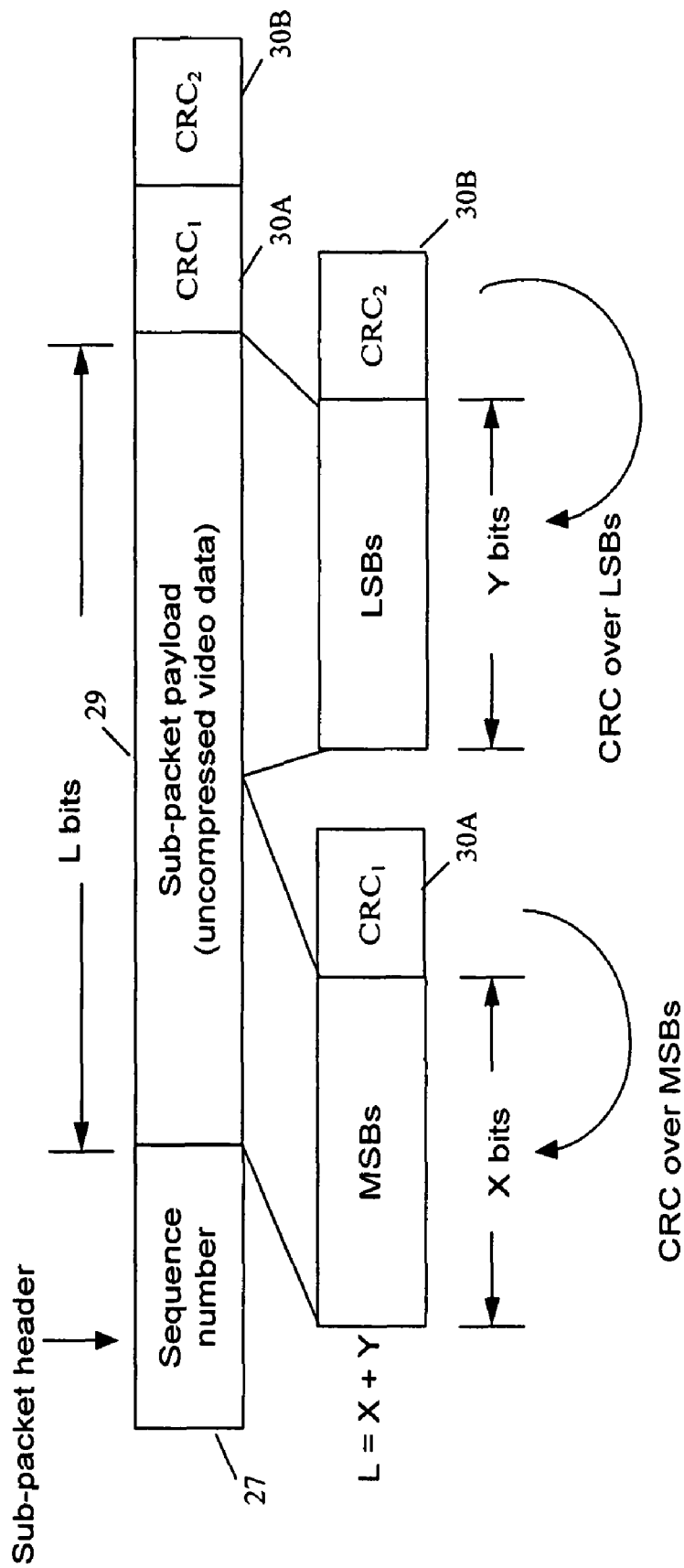
FIG. 8 shows the details of a CRC calculation for the sub-packet in FIG. 7, according to an embodiment of the present invention.

As shown diagrammatically in FIG. 8, the first CRC value $CRC_1$ is computed over X MSBs of the L bit sub-packet 12, and the second CRC value $CRC_2$ is computed over Y LSBs of the same L bit sub-packet 12. The first CRCBitmap 23A (FIG. 6) indicates to the receiver the pattern of data in the sub-packet payload for which $CRC_1$ is computed. The second CRCBitmap 23B (FIG. 6) indicates to the receiver the pattern of data in the sub-packet payload for which $CRC_2$ is computed. For CRC computation, bits are not physically re-organized. Assuming, j pixel components in a video sub-packet 12, the relationship between m, r, L, X and Y can be expressed as:

$$X = j \times m \quad (1)$$

$$Y = j \times r \quad (2)$$

$$L = X + Y \quad (3)$$

For application of UEP to a sub-packet payload, the sender uses a similar coding rate for the CRC values as well as the payload data.

In the above example, a sub-packet includes two subsets of bits, one subset X bits long, and another subset Y bits long, wherein a CRC value is calculated for each subset. The above example is applicable for calculating a number h of CRC values $CRC_i$ (i=1, . . . , h, wherein h>2), for the information bits in each sub-packet 12. In that case, each sub-packet includes h>2 subsets $SS_i$ (i=1, . . . , h) and each subset is $B_i$ (i=1, . . . , h) bits in length. Each CRC value $CRC_i$ is calculated as over the bits $B_i$ in a corresponding subset $SS_i$ of the L bits in the sub-packet 12, wherein $L = B_1 +, \ldots +, B_h$. For example, in FIG. 8, h=2, $B_1$=X, $B_2$=Y, wherein $CRC_1$ is computed over $B_1$ bits of the L bit sub-packet, and $CRC_2$ is computed over $B_2$ bits of the L bit sub-packet.

Upon receiving the packet 10, the receiver performs CRC checks, and forms an ACK packet using a bitmap of K bits. For example, when bit i in the ACK bitmap is set to "1", it indicates that the MSBs of the $i^{th}$ sub-packet 12 in the packet 10 are successfully received according to the CRC check by the receiver. When bit i in the ACK bitmap is set to zero, it indicates that the MSBs of the $i^{th}$ sub-packet are received in error. Thus, the ACK packet indicates the receipt status of the MSBs of the sub-packets 12 in the packet 10 to the sender. In this example, the ACK packet does not indicate the status of the LSBs of the sub-packets 12. For example, if the MSBs of a sub-packet 12 are correctly received based on the CRC check at the receiver using $CRC_1$ (30A in FIG. 8), but the LSBs of the sub-packet 12 are incorrectly received based on the CRC check at the receiver using the $CRC_2$ (30B in FIG. 8), the receiver sets the corresponding bit in the K bit ACK bitmap to "1." This effectively signals the sender that a retransmission of the sub-packet is not necessary because the correctly received MSBs provide most of the perceptually important video information. This alleviates the need for retransmission of the LSBs which may not add much to the perceptual quality of the video information, thereby saving time and channel bandwidth. Table 1 below further describes the rules for setting the ACK bitmap.

TABLE 1

Rules for setting a bit corresponding to the sub-packet in the bitmap

| Status of LSBs | Status of MSBs | Value of the bit in the ACK bitmap |
|---|---|---|
| Correct | Correct | 1 |
| Error | Correct | 1 |
| Correct | Error | 0 |
| Error | Error | 0 |

Upon receiving an ACK packet from the sender in response to transmission of a packet 10, the sender selectively retransmits erroneous MSBs based on their perceptual importance. During retransmission, the sender retransmits a new packet including the MSBs of a sub-packet 12 of the previously transmitted packet 10 that is indicated by the ACK bitmap in the ACK packet as erroneously received at the receiver. The sender does not include the LSBs in the retransmitted packet.

Because the sender selectively retransmits the erroneously received bits based on perceptual importance, the bandwidth required to support retransmissions is reduced. The sender retransmits only the erroneous MSBs as indicated by the ACK bitmap in the ACK packet. Because retransmissions introduce additional delay which negatively affects isochronous streams, such as uncompressed video streams, selective retransmission according to the present invention significantly reduces delay without degrading video quality.

Further, the receiver can partially recover the erroneous LSBs of a sub-packet 12 by reusing correctly received LSBs from adjacent sub-packets 12 in the packet 10. Similarly, if the receiver determines that retransmission of the erroneous MSBs in a sub-packet 12 cannot be received within the packet deadline (i.e., the time to display the packet or video pixels), the receiver can reuse correctly received MSBs from adjacent sub-packets in the packet 10 instead of the erroneous MSBs in the sub-packet 12.

Figure 9:
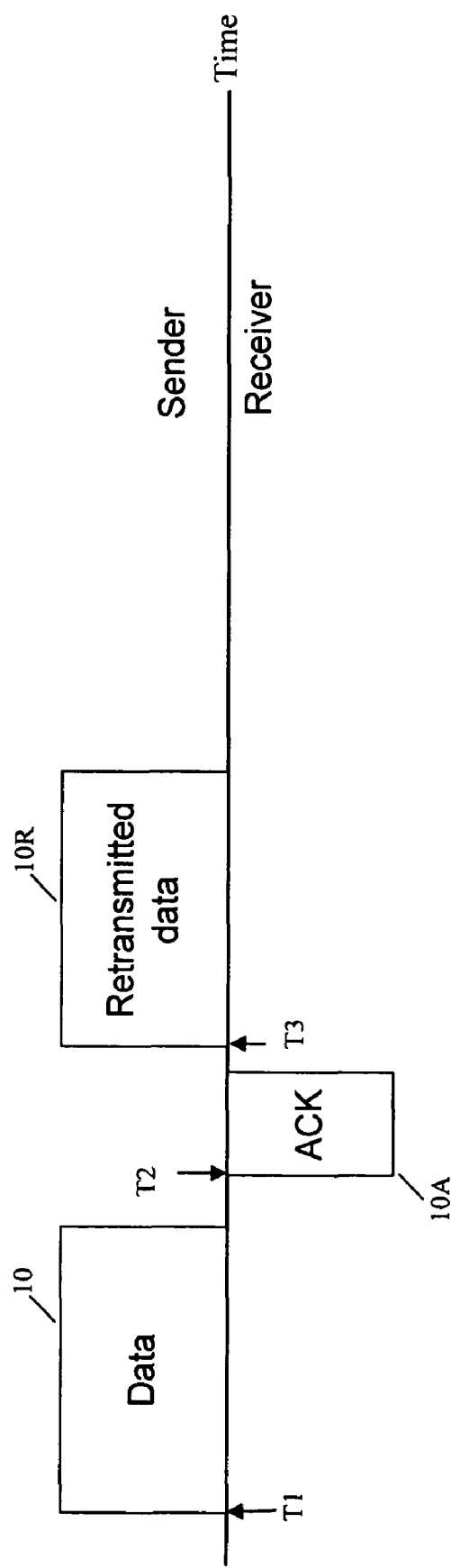
FIG. 9 shows a timing diagram of an immediate retransmission method, according to an embodiment of the present invention.

When based on the ACK packet from the receiver it becomes necessary for the sender to retransmit a correct copy of erroneously received data. In one example, the sender retransmits sub-packets by immediate retransmission of the corrupted data to the receiver in a retransmission packet, as shown by the timing diagram in FIG. 9, according to the present invention. At time T1 the sender sends a packet 10 of uncompressed video pixel data (along with CRC fields) to the receiver, and at time T2 the receiver sends back an ACK packet 10A to the sender, indicating the corrupted data. Upon receiving an ACK packet from the receiver, the sender invokes essentially immediate retransmission of the corrupted data in a retransmission sub-packet 10R at time T3.

Figure 10:
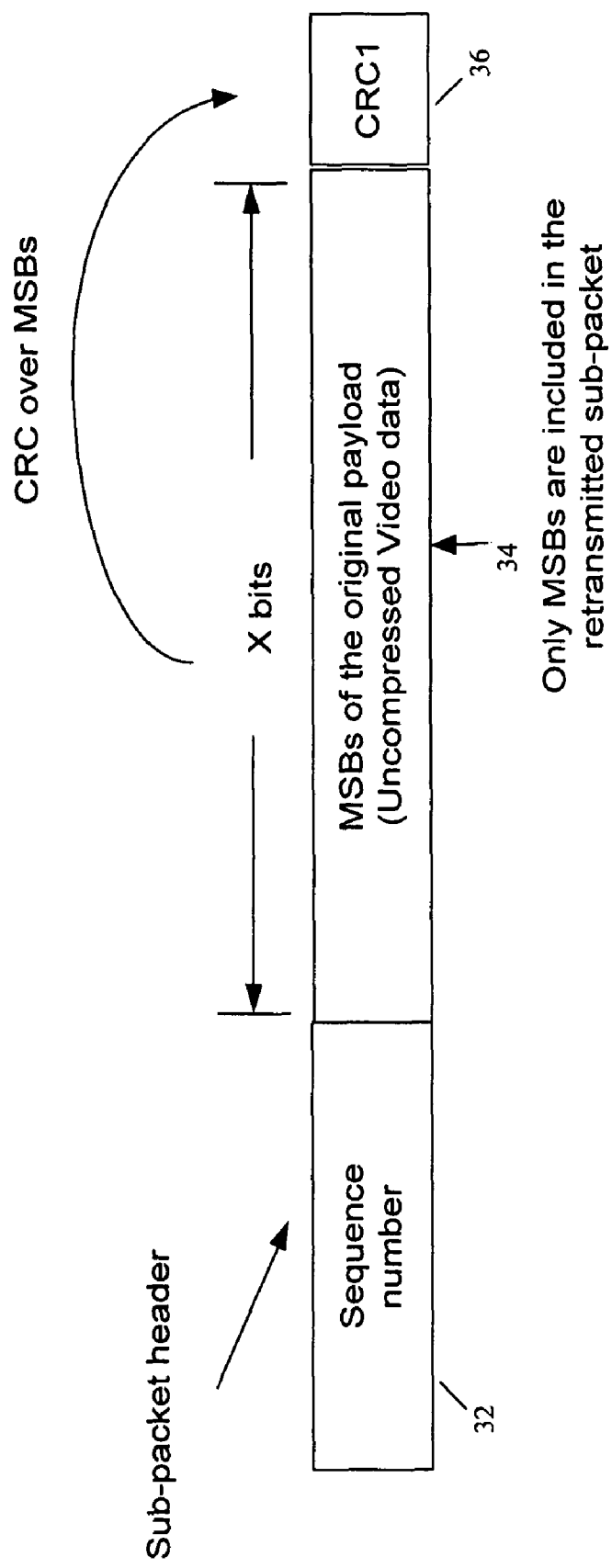
FIG. 10 shows a retransmitted sub-packet, according to an embodiment of the present invention.

As shown by example in FIG. 10, the retransmitted sub-packet 10R includes a sequence number field 32 which is copied from the sequence number sub-field 27 of the originally transmitted sub-packet 12. The sub-packet 10R further includes a payload 34 comprising of only the MSBs of the original payload 29 are included in the retransmitted sub-packet 10R. The sub-packet 10R further includes a CRC value CRC1 in a CRC field 36 for the payload 34. As described further below, in one example, the sub-packet 10R can be part of a general retransmit packet which includes one or more retransmit sub-packets 10R.

Figure 11:
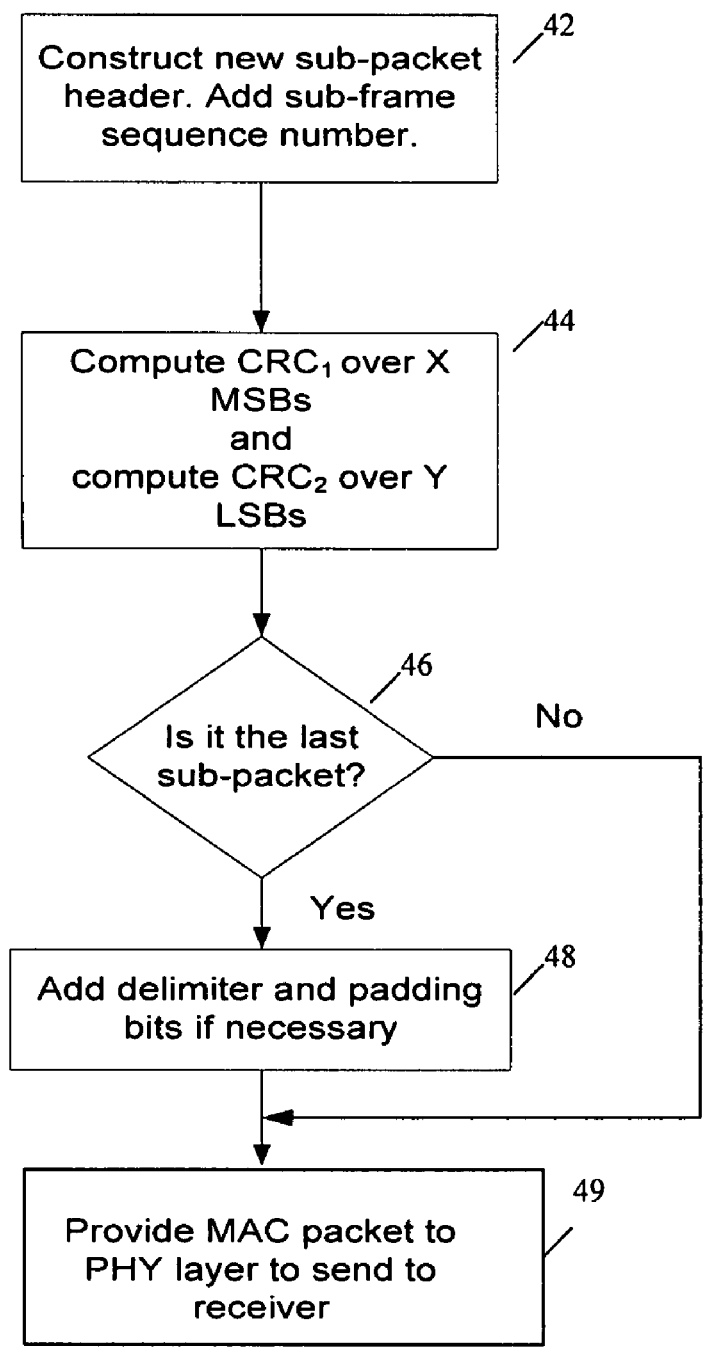
FIG. 11 shows a flowchart of a sub-packetization process by the sender, for constructing each sub-packet in the packet of FIG. 2, according to an embodiment of the present invention.

FIG. 11 shows an example flowchart of a sub-packetization process 40 by the sender, for constructing each sub-packet 12 in a MAC packet 10 (FIG. 7), comprising the steps of:

Step 42: Construct a new sub-packet 12 for the MAC packet 10, including a sub-packet header 28, and add a sequence number of the sub-packet 12 in the sequence number field 27.

Step 44: Compute a first CRC ($CRC_1$) over X MSBs of sub-packet payload 29, and compute a second CRC ($CRC_2$) over Y MSBs of sub-packet payload 29.

Step 46: Determine if this is the last sub-packet for the MAC packet 10? Is not, go to step 49, otherwise go to step 48.

Step 48: Add delimiter 15 (FIG. 3) to the sub-packet 12.

Step 49: Provide the MAC packet 10 to a PHY layer of the sender to send to the receiver.

After all of the sub-packets 12 for the MAC packet 10 are constructed, a CRC Control Field 21 is placed in the MAC HDR 18 of the MAC packet 10, and the (MAC) packet 10 is then transmitted from the sender to the receiver over a wireless channel. In another implementation, rather than placing a CRC Control Field 21 in the MAC HDR 18 of the MAC packet 10, the sender and the receiver negotiate a CRC Control Field by exchanging management or control frames. Whenever the sender or receiver wishes to change the CRC Control Field, they exchange another set of control or management frames to successfully negotiate a new value for the CRC Control Field.

Figure 12:
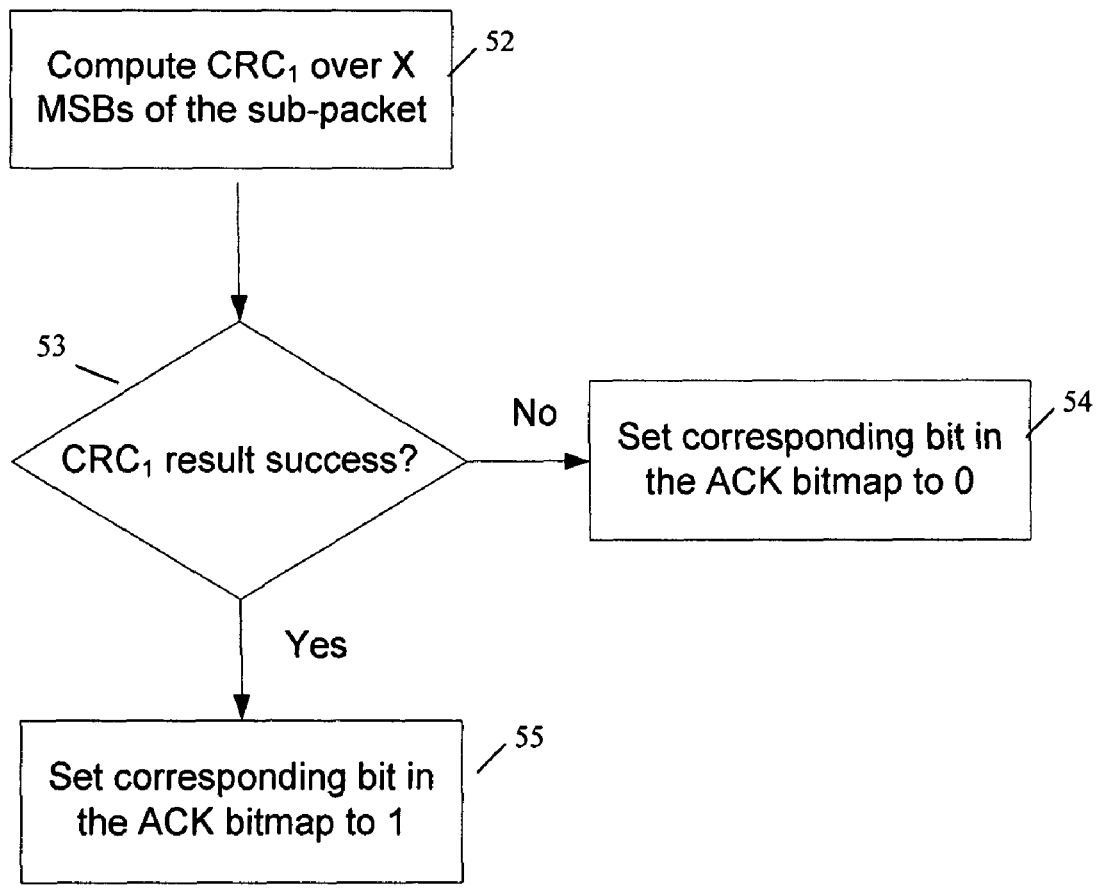
FIG. 12 shows a flowchart for sub-packet processing in a receiver and generating a responsive ACK packet (frame), according to an embodiment of the present invention.
Figure 13:
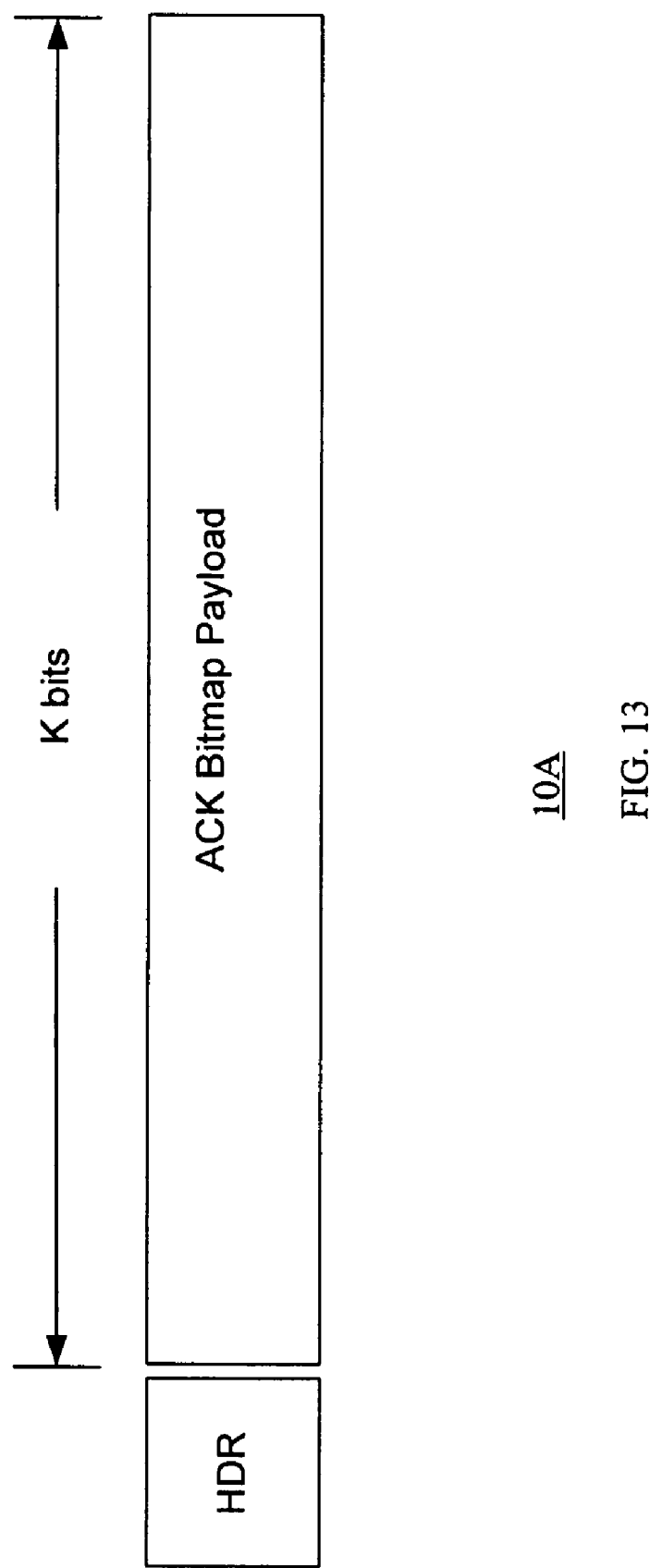
FIG. 13 shows an example of an ACK packet, according to the present invention.

FIG. 12 shows an example flowchart of a process 50 at the receiver for checking each sub-packet 12 in a received MAC packet 10, to generate an ACK packet 10A (FIG. 13) in response, comprising the steps of:

Step 52: Compute a CRC check over X MSBs of the received sub-packet 12.

Step 53: Based on the computed CRC, determine if the X MSBs were received successfully? If yes, then go to step 55, otherwise go to step 54.

Step 54: Set the corresponding bit in the ACK bitmap of the ACK packet to "0".

Step 55: Set the corresponding bit in the ACK bitmap of the ACK packet to "1".

Figure 14:
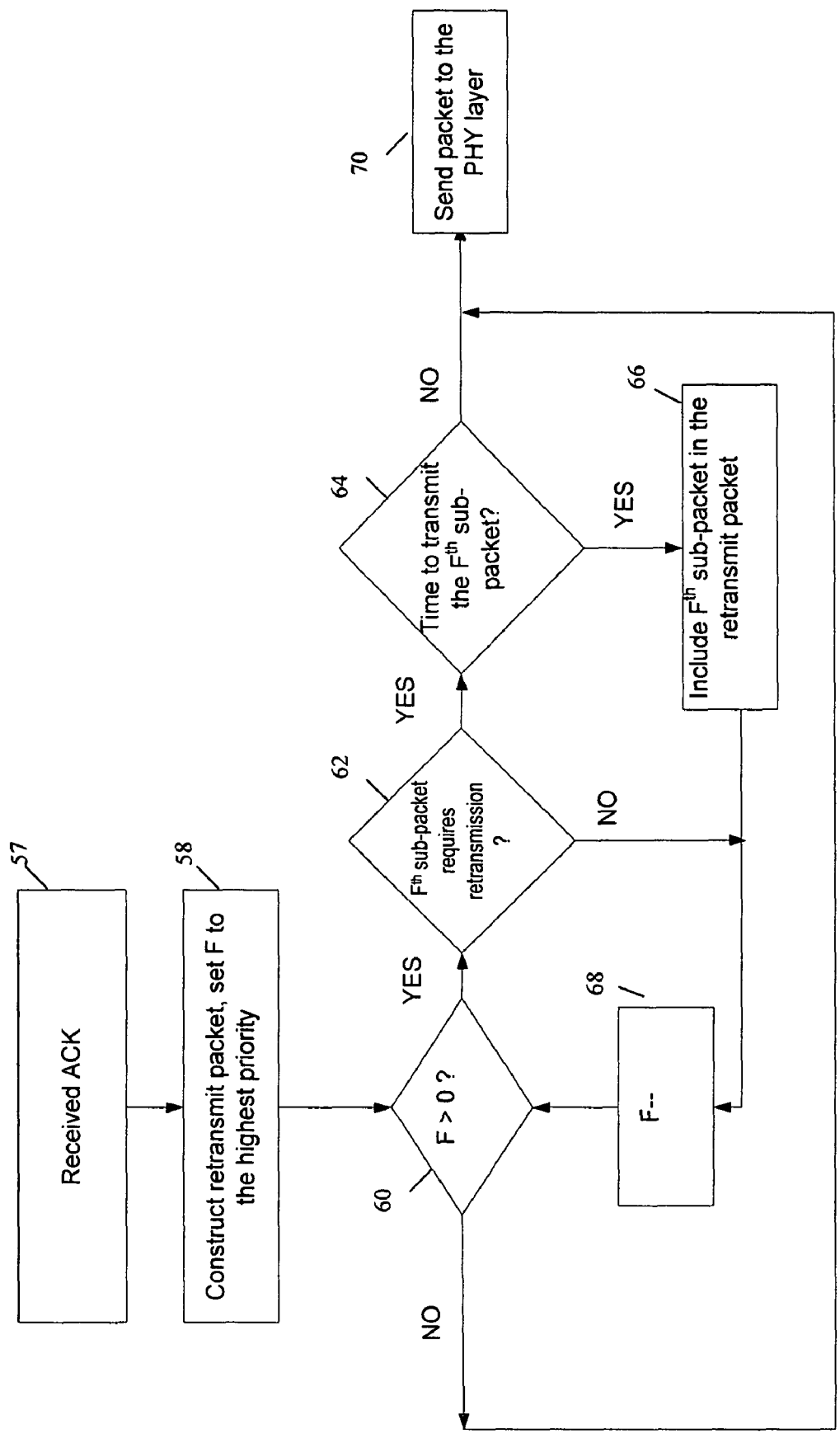
FIG. 14 shows a flowchart of a retransmission process implemented by the sender, according to an embodiment of the present invention.

FIG. 14 shows a flowchart of an example retransmission process 56 implemented by the sender after sending a packet to the receiver. The sender constructs a retransmit packet including one or more retransmit sub-packets 10R, according to the steps of:

Step 57: Receive an ACK packet from the receiver.

Step 58: Construct an initial retransmit packet, and set an index F (non-zero) to the number of sub-packets which are acknowledged in the ACK packet. In order to meet the playback deadline per packet at the receiver, a re-transmit packet 10R has higher priority than a normal transmit packet 10 packet. Further, a packet which has been re-transmitted more times has higher priority than a packet which has been re-transmitted less times or one that has not been retransmitted yet.

Step 60: If F>0, then go to step 62, otherwise go to step 70.

Step 62: Based on the ACK packet, determine if the $F^{th}$ sub-packet in the last transmitted packet requires retransmission? If yes, go to step 64, otherwise go to step 68.

Step 64: Determine if there is sufficient time left to re-transmit the $F^{th}$ sub-packet based on the receiver side playback deadline for each sub-packet? If not, go to step 70, otherwise, go to step 66.

Step 66: Include the $F^{th}$ sub-packet in the retransmit packet.

Step 68: Decrement F (e.g., by one), and go back to step 60.

Step 70: Send a retransmit packet to the PHY layer for transmission to the receiver.

In another example, the sender invokes delayed retransmissions of corrupted data. Initially the sender sends Q packets 10 of video pixel data with CRC fields to the receiver, the receiver transmits back Q corresponding ACK packets to the sender, and the sender receives Q corresponding ACK packets from the receiver. As such, the sender collects Q ACK packets. Based on the collected ACK packets, the sender determines the sub-packets in the last Q packets that need retransmissions. Then, the sender begins a retransmission phase by retransmitting the corrupted sub-packets from the highest priority sub-packet in perceptual importance, and continues until it can retransmit other sub-packets in order of priority in perceptual importance, without violating the receiver's presentation deadline.

The sender includes the necessary signaling information in retransmissions so that the receiver can determine which sub-packets are retransmitted and to which packets they belong to. Assuming N bits per pixel component and retransmission after Q packets, at most N×Q bits are needed to signal the presence/absence of each sub-packet in said retransmissions.

Figure 15:
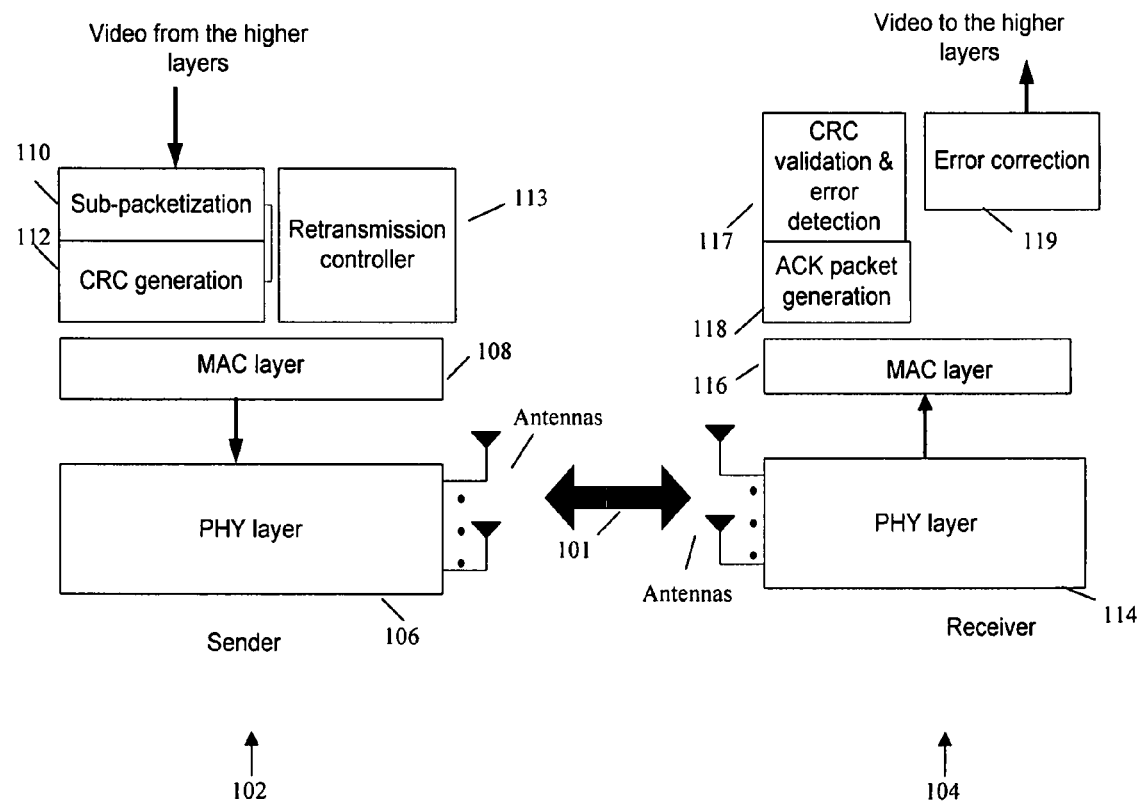
FIG. 15 shows a functional block diagram of a wireless communication system implementing data packet transmission, according to an embodiment of the present invention.

FIG. 15 shows a functional block diagram of an example wireless communication system 100 implementing data packet transmission, wherein each packet comprises multiple sub-packets, multiple CRCs and selective retransmissions, for enhancing transmission reliability of uncompressed video packets over wireless channels, according to an embodiment of the present invention. The system 100 includes a wireless sender 102 and a wireless receiver 104. The sender 102 includes a PHY layer 106 and a MAC layer 108. Similarly, the receiver 104 includes a PHY layer 114 and a MAC layer 116. The PHY and MAC layers provide wireless communication between the sender 102 and the receiver 104 via antennas through wireless medium 101.

The sender 102 further includes a sub-packetization module 110 that receives uncompressed video from higher levels (e.g., a video source such as a HDVD player), and generates sub-packets of uncompressed video from the uncompressed video pixels, as described above, according to the present invention. The sender 102 further includes a CRC generation module 112 that generates said CRC Control Field and CRC values, as described above. The generated sub-packets along with the CRC Control Field and CRC values are placed in a packet 10 by the MAC layer 108, and transmitted by the PHY layer 106. The sender 102 further includes a retransmission controller 113 that implements the retransmission of corrupted data, as described above according to the present invention.

In the wireless receiver 104, the PHY/MAC layers 114/116, process each received packet. The receiver 104 further includes a CRC validation and error detection module 117 that uses the CRC Control Field and CRC values per packet to validate the CRC value and detect errors in the sub-packets in each packet accordingly. The receiver 104 further includes an ACK frame generation module 118 that in conjunction with the MAC layer generates said ACK packet to indicate to the sender which sub-packets in a packet are corrupted. The receiver 104 further includes an error correction module 119 that receives retransmitted sub-packets from the sender and provides corrected uncompressed video pixels to higher layers for consumption (e.g., display).

Though in FIG. 15, modules 117, 118 and 114 in the receiver 104 are shown separate from the MAC layers 116, one or more of the modules 117, 118 and 114 can be a component of the MAC layer 116. Similarly, one or more of the modules 110, 112 and 113 in the sender can be a component of the MAC layer 108.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for communication of video information over a wireless channel, comprising:
   inputting video pixels, wherein each pixel includes a plurality of components and each component comprises video information bits;
   forming a packet from the video information bits by sub-packetizing the video information bits into sub-packets, wherein each sub-packet comprises L information bits, where L is a positive integer;
   determining error detection information for one or more sub-packets based on determining a first cyclic redundancy code (CRC) sub-value over X MSBs of the L bit sub-packet, and determining a second CRC sub-value over Y LSBs of the L bit sub-packet, where X and Y are positive integers;
   placing the error detection information in the packet; and
   transmitting the packet from a sender to a receiver over a wireless channel wherein transmission reliability of the information bits is enhanced.

2. The method of claim 1 wherein:
   placing the error detection information in the packet includes placing the CRC sub-value for each sub-packet in the packet.

3. The method of claim 2 wherein each of said one or more sub-packets comprises a sub-packet header, a payload and a CRC sub-field, such that the sub-packet header includes a sequence number indicating the order of the corresponding sub-packet in the packet.

4. The method of claim 3 wherein a sequence number is assigned in monotonically increasing order starting from zero, whereby the sequence number of a first sub-packet is 0, and the sequence number of a Kth sub-packet is K−1.

5. The method of claim 4 wherein the packet includes a payload of M pixel components, each pixel component comprising N bits, such that the P=M×N payload bits are divided into K sub-packets of L bits each.

6. The method of claim 2 wherein the packet includes multiple CRC fields corresponding to multiple sub-packets, wherein placing the CRC values in the packet comprises placing the CRC value for each sub-packet in a corresponding CRC field in the packet.

7. The method of claim 6 wherein the CRC field for each sub-packet is in the sub-packet.

8. The method of claim 6 wherein: L information bits =X MSB+Y LSB.

9. The method of claim 6, wherein:
   each sub-packet includes a set of L information bits in multiple subsets of bits;
   determining a CRC value for the information bits in the sub-packet further includes determining a CRC sub-value for each subset of bits in the sub-packet, such that each sub-packet includes multiple subsets of bits and multiple corresponding CRC sub-values.

10. The method of claim 9 further comprising of placing a CRC Control Field in a MAC header of the packet to signal the receiver how the sub-packets are formed for CRC error detection at the receiver.

11. The method of claim 10 wherein the CRC Control Field indicates the number of CRC values in the packet, and further, for each sub-packet identifies the subset of bits for which a corresponding CRC value is determined.

12. The method of claim 2 further comprising:
receiving the packet at the receiver;
based on the CRC values, determining corrupted information in each sub-packet;
generating an ACK packet to indicate the corrupted information to the sender; and
transmitting the ACK packet to the sender.

13. The method of claim 12 further comprising:
receiving an ACK packet at the sender;
based on the ACK packet, generating a retransmit packet including correct information bits that are indicated by the ACK packet as corrupted in a corresponding packet previously transmitted from the sender; and
transmitting the retransmit packet to the receiver.

14. The method of claim 13 wherein generating a retransmit packet comprises generating a retransmit packet including only information bits of higher perceptual importance than other information bits based on an ACK packet from the receiver.

15. The method of claim 14 wherein generating a retransmit packet comprises generating a retransmit packet including only the MSBs of a corrupt sub-packet based on an ACK packet from the receiver.

16. The method of claim 15 wherein generating a retransmit packet comprises generating a retransmit packet including only the MSBs of a corrupt sub-packet, even if the LSBs were also corrupt.

17. The method of claim 12 wherein the ACK packet indicates the corrupted information bits to the sender based on perceptual importance of such information bits.

18. The method of claim 17 wherein generating a retransmit packet comprises generating a retransmit packet including information bits that are indicated as corrupt by the ACK packet, based on human perceptual importance of the information bits.

19. The method of claim 1 wherein each of one or more sub-packets in the packet includes a plurality of subsets of bits in the sub-packet, such that determining an error detection value for the information bits in that sub-packet further includes determining a CRC sub-value for each subset of bits, wherein a plurality of CRC sub-values are generated for the corresponding plurality of subsets of bits in each sub-packet.

20. The method of claim 19 wherein the error detection information comprises CRC information.

21. The method of claim 19 wherein the information bits in each subset of bits have similar perceptual importance.

22. The method of claim 1, wherein the video information comprises uncompressed video information.

23. The method of claim 22, wherein the video information comprises uncompressed high definition video information.

24. A transmitter for communication of video information over a wireless channel, the video information including video pixels, each pixel including a plurality of components and each component including video information bits, comprising:
a packetizer configured to form a packet from the video information bits by sub-packetizing the video information bits into sub-packets, wherein each sub-packet includes L information bits;
an error detection information generator that generates error detection information for one or more sub-packets comprising a cyclic redundancy check (CRC) value, wherein the CRC value for the information bits in the sub-packet further includes a first CRC sub-value over X MSBs of the L bit sub-packet, and a second CRC sub-value over Y LSBs of the L bit sub-packet; and
a transmission module configured to transmit the packet and error detection information over a wireless channel.

25. The transmitter of claim 24 wherein:
the error detection information for a sub-packet includes a CRC sub-value for the information bits in that sub-packet; and
the CRC sub-value for each sub-packet is placed in the sub-packet.

26. The transmitter of claim 25 wherein each of said one or more sub-packets comprises a sub-packet header, a payload and a CRC sub-field, such that the sub-packet header includes a sequence number indicating the order of the corresponding sub-packet in the packet.

27. The transmitter of claim 26 wherein a sequence number is assigned in monotonically increasing order starting from zero, whereby the sequence number of a first sub-packet is 0 and the sequence number of a Kth sub-packet is K−1.

28. The transmitter of claim 27 wherein the packet includes a payload of M pixel components, each pixel component comprising N bits, such that the P=M×N payload bits are divided into K sub-packets of L bits each.

29. The transmitter of claim 25 wherein the packet includes multiple CRC fields corresponding to multiple sub-packets.

30. The transmitter of claim 29 wherein the video information comprises uncompressed video information.

31. The transmitter of claim 29 wherein: L information bits =X MSB+Y LSB.

32. The transmitter of claim 29 wherein:
each sub-packet includes a set of L information bits in multiple subsets of bits; and
the CRC value for the information bits in the sub-packet further includes a CRC sub-value for each subset of bits in the sub-packet, such that each sub-packet includes multiple subsets of bits and multiple corresponding CRC sub-values.

33. The transmitter of claim 32 wherein the packetizer further places a CRC Control Field in a MAC header of the packet to signal the receiver how the sub-packets are formed for CRC error detection at the receiver.

34. The transmitter of claim 33 wherein the CRC Control Field indicates the number of CRC values in the packet, and further, for each sub-packet identifies the subset of bits for which a corresponding CRC value is determined.

35. The transmitter of claim 34 wherein each of one or more sub-packets in the packet includes a plurality of subsets of bits in the sub-packet, such that the error detection information generator is further configured to generate an error detection value for the information bits in a sub-packet by determining a CRC sub-value for each subset of bits in the sub-packet, thereby generating a plurality of CRC sub-values for the corresponding plurality of subsets of bits in the sub-packet.

36. The transmitter of claim 35 wherein the error detection information comprises CRC information.

37. The transmitter of claim 36 wherein the information bits in each subset of bits have similar perceptual importance.

38. The transmitter of claim 29 further comprising a retransmission module configured to generate a retransmit packet based on an ACK packet from a receiver that indicates corrupted information bits in the transmitted packet, wherein the retransmit packet includes correct information bits that are indicated by the ACK packet as corrupt in a corresponding packet previously transmitted from the transmitter.

39. The transmitter of claim 38 wherein the ACK packet indicates the corrupted information bits to the transmitter, based on perceptual importance of such information bits.

40. The transmitter of claim 39 wherein the retransmit packet includes information bits that are indicated as corrupt by the ACK packet based on human perceptual importance of the information bits.

41. The transmitter of claim 38 wherein the retransmit packet includes only information bits of higher perceptual importance than other information bits based on ACK packet from the receiver.

42. The transmitter of claim 38 wherein the retransmit packet includes only the MSBs of a corrupt sub-packet based on an ACK packet from the receiver.

43. The transmitter of claim 42 wherein the retransmit packet includes only the MSBs of a corrupt sub-packet, even if the LSBs were also corrupt.

44. The transmitter of claim 24 wherein the video information comprises uncompressed high definition video information.

45. A receiver for communication of video information over a wireless channel, the video information including video pixels, each pixel including a plurality of components and each component including video information bits, comprising:
- a communication module configured to receive a packet of video information from a transmitter over a wireless channel, the packet including sub-packets of video information bits, and each of one or more of the sub-packets including error detection information for the information bits therein, wherein each sub-packet includes L information bits, wherein L is a positive integer;
- an error check module configured to determine corrupted information in each sub-packet based on the corresponding error detection information comprising a cyclic redundancy check (CRC) value for the information bits in the sub-packet further includes a first CRC sub-value over X MSBs of the L bit sub-packet, and a second CRC sub-value over Y LSBs of the L bit sub-packet, where X and Y are positive integers; and
- an acknowledgment packet generator configured to generate an ACK packet to indicate the corrupted information to the transmitter;
- wherein the communication module of the receiver transmits the ACK packet back to the transmitter.

46. The receiver of claim 45 wherein:
the error detection information for a sub-packet includes a CRC sub-value for the information bits in that sub-packet; and
the CRC sub-value for each sub-packet is placed in the sub-packet.

47. The receiver of claim 46 wherein each of said one or more sub-packets comprises a sub-packet header, a payload and a CRC sub-field, such that the sub-packet header includes a sequence number indicating the order of the corresponding sub-packet in the packet.

48. The receiver of claim 46 wherein the packet includes multiple CRC fields corresponding to multiple sub-packets.

49. The receiver of claim 48 wherein: L information bits =X MSB+Y LSB.

50. The receiver of claim 48 wherein:
each sub-packet includes a set of L information bits in multiple subsets of bits;
the CRC value for the information bits in the sub-packet further includes a CRC sub-value for each subset of bits in the sub-packet, such that each sub-packet includes multiple subsets of bits and multiple corresponding CRC sub-values.

51. The receiver of claim 50 the packet includes a CRC Control Field to signal the receiver how the sub-packets are formed for CRC error detection at the receiver.

52. The receiver of claim 51 wherein the CRC Control Field indicates the number of CRC values in the packet, and further for each sub-packet identifies the subset of bits for which a corresponding CRC value is determined.

53. The receiver of claim 52 wherein each of one or more sub-packets in the packet includes a plurality of subsets of bits and the sub-packet further includes a CRC sub-value for each subset of bits in the sub-packet, whereby the sub-packet includes a plurality of CRC sub-values for the corresponding plurality of subsets of bits in the sub-packet.

54. The receiver of claim 53 wherein the information bits in each subset of bits have similar perceptual importance.

55. The receiver of claim 54 wherein the ACK packet indicates the corrupted information bits to the transmitter based on perceptual importance of such information bits.

56. The receiver of claim 54 wherein the ACK packet indicates only corrupt information bits of higher perceptual importance in a sub-packet than other information bits.

57. The receiver of claim 55 wherein the ACK packet indicates only the corrupt MSBs of a corrupt sub-packet.

58. The receiver of claim 57 wherein the ACK packet indicates only the MSBs of a corrupt sub-packet, even if the LSBs were also corrupt.

* * * * *